United States Patent
Ishii

(10) Patent No.: US 6,377,790 B1
(45) Date of Patent: Apr. 23, 2002

(54) MOBILE-INITIATED, PACKET SWITCHED COMMUNICATIONS METHOD

(75) Inventor: Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/264,586

(22) Filed: Mar. 8, 1999

(51) Int. Cl.$^7$ ................................................ H04B 1/16
(52) U.S. Cl. ...................... 455/343; 455/422; 455/466; 370/352
(58) Field of Search ................................. 455/343, 127, 455/38.3, 522, 422, 403, 414, 426, 466; 709/227–229; 370/352, 320, 335

(56) References Cited

U.S. PATENT DOCUMENTS

| | | | |
|---|---|---|---|
| 5,140,698 A | 8/1992 | Toko | 455/76 |
| 5,179,724 A | 1/1993 | Lindoff | 455/76 |
| 5,224,152 A | 6/1993 | Harte | |
| 5,241,542 A * | 8/1993 | Natarajan et al. | 455/343 |
| 5,507,039 A | 4/1996 | Honma | 455/343 |
| 5,535,207 A * | 7/1996 | Dupont | 455/38.4 |
| 5,560,021 A | 9/1996 | Vook et al. | |
| 5,590,396 A | 12/1996 | Henry | 455/331 |
| 5,627,882 A | 5/1997 | Chien et al. | |
| 6,119,024 A * | 9/2000 | Takayama | 455/343 |

OTHER PUBLICATIONS

Publication entitled, "Narrowband Sockets Specification"a, Revision 1.0, Mar. 7, 1997, Intel, Nokia, pp. 1–4.

* cited by examiner

Primary Examiner—Doris H. To
(74) Attorney, Agent, or Firm—David C. Ripma; Matthew D. Rabdau; Scott C. Krieger

(57) ABSTRACT

A method is provided which permits the conservation of wireless mobile station battery power in a system where only the mobile station initializes requests for data transfer, such as a wireless packet switched connection network. The method is especially practical in the transfer of large amounts of data that need not be received in real-time. Since only the mobile unit user, or mobile unit imbedded applications program initiates requests for data transfer, the mobile station need not monitor the forward link signal. The mobile station Deep Dormant™ mode saves battery power by completely disabling the receiver circuit when no data is to be sent or received. As a result, the mobile station enjoys longer battery life.

17 Claims, 4 Drawing Sheets

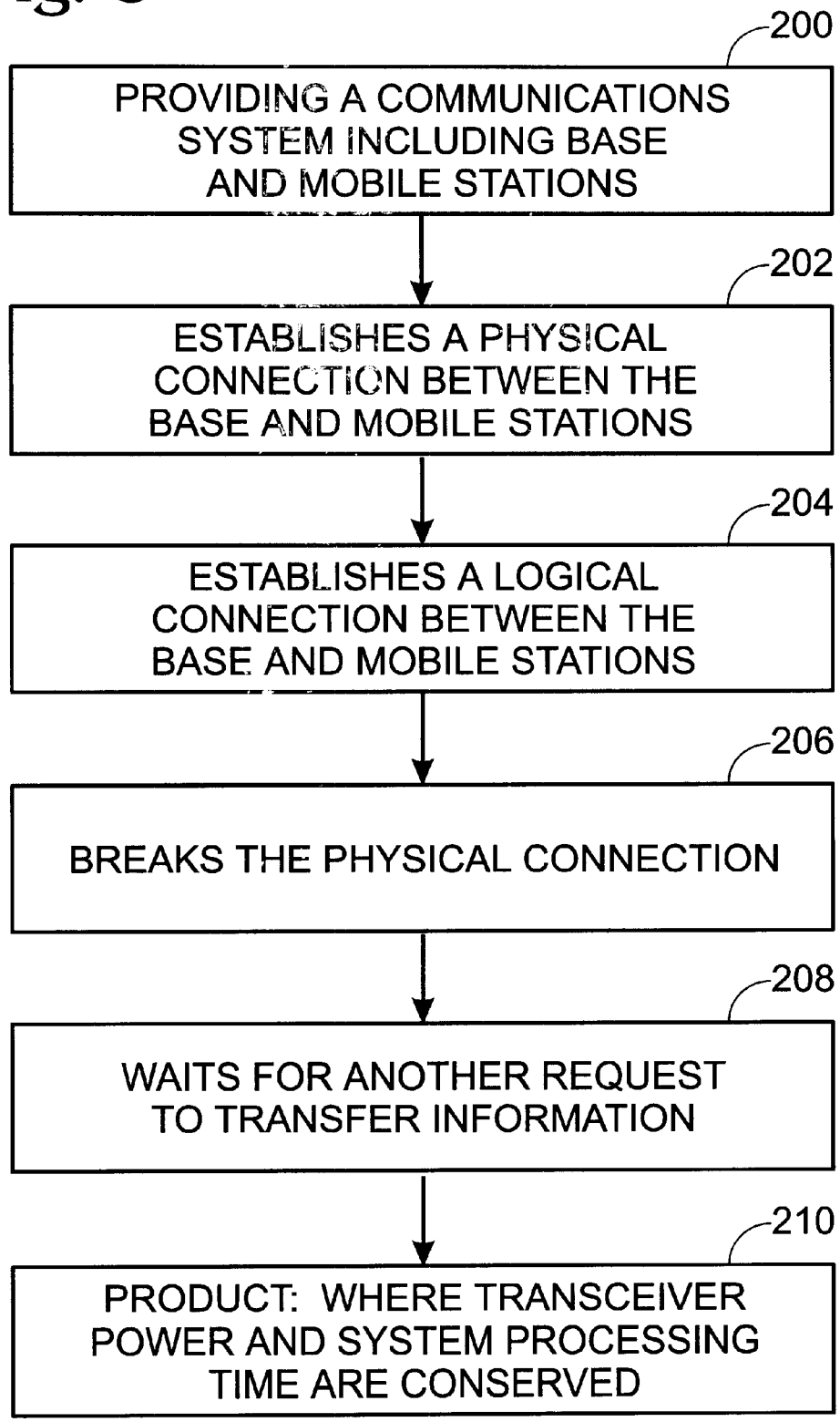

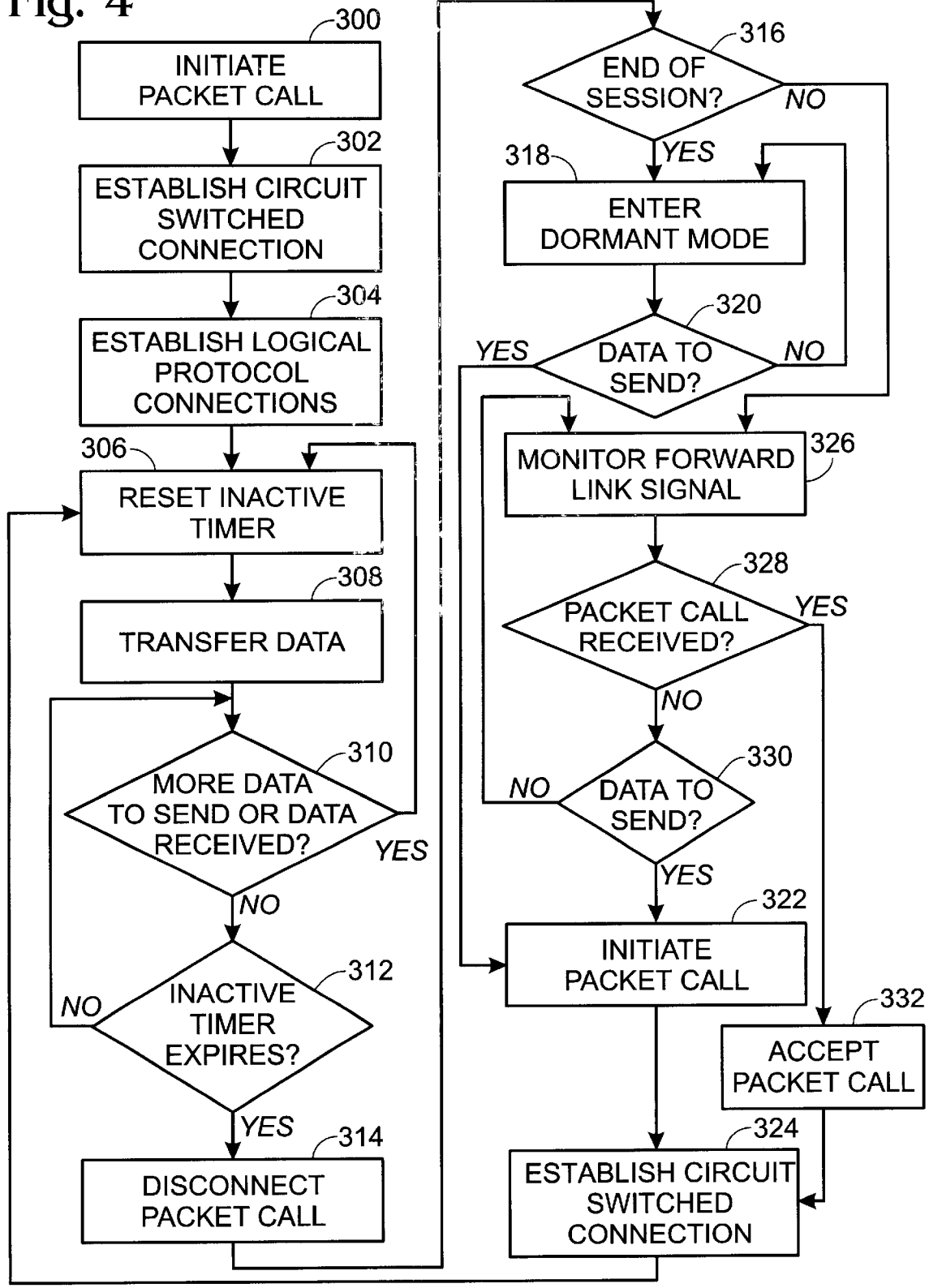

MOBILE-INITIATED, PACKET SWITCHED COMMUNICATIONS METHOD

BACKGROUND AND SUMMARY OF THE INVENTION

The present invention is generally related to wireless communications and, more particularly, to a method of conserving mobile station battery power in the wireless network communicating packets of information to and from a mobile station.

FIG. 1 illustrates a prior art algorithm for packet switched communications. Typically, user requests for the transfer of information are processed through a higher-level software routine which coordinates a logical connection to the base station or communicating server, requests a traffic channel to transfer data, and requests the data be formatted for communication on the traffic channel, using the packet switched communication method. In Step 10, when the application program requests a data transfer, the mobile station initiates a call with an indication that a packet switched communication (a packet call) is to be established. In Step 12 a circuit switched connection is established by occupying a radio channel assigned by the base station. Typically, the connection is a type of circuit switched connection called a packet switched connection. Whereas a circuit switched connection maintains the physical connection until the physical connection is broken by either the base or mobile station, a packet switched connection permits the physical connection to be broken in between data transfers. Alternately stated, a packet switched connection is a series of circuit switched connections.

In Step 14 the mobile station starts negotiation process with the system using protocols such as transmission control protocol (TCP) to establish the logical protocol connections. Typically, a TCP protocol implies the connection of the base station to at least one server through a packet network. Radio link protocols (RLP) and point-to-point protocols (PPP) more directly concern the link between the mobile station and the base station, which is typically the subject of Step 14. In Step 16 the mobile station resets the inactive timer, and starts the data transfer in Step 18.

In Step 20 the mobile station monitors an arrival of data, either from the base station or from the application program. That is, either the user (through the applications program), or the communicating base station, can request the initiation of data transfer. The inactive timer is reset the arrival of data in Step 16. During data transfer, the mobile station repeatedly checks the status of the inactive timer (Step 22). If the timer does not expire ("No", Step 22), the mobile station continues monitoring the arrival of data by returning to Step 20 of the process. If the timer expires ("Yes", Step 22), the mobile station considers that the data transfer is finished, disconnects the packet call, and terminates the circuit switched connection by proceeding to Step 24. The mobile station then enters into a type of standby mode where the mobile continues to monitor base station control signals. In Step 26 the mobile station periodically monitors the forward link signal (signal from the base station).

In the standby mode, while maintaining the logical protocol connections, the mobile station waits for either of the following two events. Alternately, the mobile station may have a dormant type standby mode where the mobile station monitors the base station less frequently. If, in Step 28 there is no page by the base station (No), the process proceeds to Step 30. If, in Step 30 there is no data to send (No), the process returns to Step 26. If there is an arrival of data from the application program in Step 30 (Yes), the process proceeds to Step 32. In Step 32 the call is initiated by the mobile station, and the packet switched connection is re-established in Step 34.

If, in Step 28 a packet call is received, originated by the base station (Yes), the mobile station accepts the packet call in Step 36 and proceeds to Step 34. Regardless of how the process reaches Step 34, the inactive timer is reset in Step 16, the data transfer is started in Step 18.

Typical application programs using the above-described method of FIG. 1 are Internet type applications, such as Web browsers and e-mail readers. In such application programs, the communication between the mobile station and the base station consists of a series of data transfer sessions. A session begins when the user of the application program requests access to a homepage or e-mail account, and ends when all the requested data is transferred to the application program. Typically, the session is initiated by the user of the application program, not by any entity of the network, including the cellular communication system, or any network or internet server. In other words, once a session of data transfers is finished, the next data transfer will not happen until the user requests another session. However, prior art mobile stations are required to activate receiver circuitry, periodically monitoring the forward link signal after the end of a session, in search of a request from the base station (Step 28 of FIG. 1), even though such a request will never come. The constant monitoring process by the mobile station wastes battery power.

Some prior art system have developed communication protocols to reduce the mobile station monitoring of base station control messages in some special circumstances. These designs reduce the mobile station's power consumption to the extent that the monitoring process is reduced. For example, in U.S. Pat. No. 5,590,396, invented by Henry, a method of power saving is disclosed which places the mobile station into a pager-only mode, with periodically wake-ups to receive short messages from a base station. In U.S. Pat. No. 5,627,882, invented by Chien et al., power is saved by changing the duration of sleep, or reduced mobile station monitoring times based on the standby time history. In U.S. Pat. No. 5,560,021, invented by Vook et al., a wireless local area network (LAN) power management system is disclosed having a periodic active mode, where indicator signals are transmitted to inform the specific devices if data is forthcoming. Devices not receiving an indicator signal are permitted to enter a sleep mode. All the above-mentioned devices use at least some power in monitoring the base station control signals.

It would be advantageous if a wireless packet information system could conserve mobile station battery power through the elimination of unnecessary monitoring of the base station control signals.

It would be advantageous if a mobile station could conserve battery power by breaking the physical channel to a communication base station in between packet information sessions.

It would be advantageous if a mobile station could enter a dormant, low-power consumption mode when the physical connection is temporarily disabled, even if the logical protocol connection is still established.

Accordingly, in a communications system including a base station and at least one mobile station, a method has been provided for the mobile station to organize the transfer of information with the base station. The method comprises the steps of:

a) energizing the mobile station receiver when information is to be transferred;

b) disabling the mobile station receiver when no information is to be transferred; and c) maintaining the disabled state of the mobile station receiver until the mobile station receives another request from the user interface to transfer information. Battery power and system processing time are conserved by not monitoring the link to the base station between information transfer tasks.

Typically, the data transfer process is initiated through a request from the mobile station user interface. Likewise, following Step a), the mobile station accepts a request from the user interface to end the transfer of information. The user interface may be in the form of an application program, such as a web browser, which initiates requests for data. The application program signals the end of an information request.

The physical connection enabling the transfer of information between the base station and the mobile station in Step a) utilizes a plurality of data messages on a traffic channel. The complete set of data messages which transfers the information is called an information session. Step b), therefore, disables the mobile station receiver at the end of the information session, so that no further messages are sent on the traffic channel. As is well known, the traffic channel may be in the form a channel distinguished by an orthogonal code, carrier frequency, modulation frequency, or timing. Likewise, Step a) includes the timing and channels of the data messages between the base station and the mobile station being dependent on a plurality of control messages between the base and mobile stations. Step b) disables the control message monitoring of the base station by the mobile station, and Step c) maintains the disabled state of control message monitoring by the mobile station, until the mobile station receives another request from the user interface to transfer information.

BRIEF DESCRIPTION OF THE DRAWINGS

FIG. 3 illustrates another preferred embodiment of the present invention method for the mobile station to organize the transfer of information with the base station.

FIG. 4 illustrates a more detailed algorithm of the present invention packet switched communication method illustrated in FIGS. 2 and 3.

In another preferred embodiment of the present invention.

DETAILED DESCRIPTION OF THE PREFERRED EMBODIMENT

In digital cellular communication systems, such as in CDMA systems, the present invention packet switched communication method is realized by establishing logical protocol connections between a mobile station and the system. A physical, or selective circuit switched connection is established between the mobile station and a base station only when data is being transferred.

Figure 2:
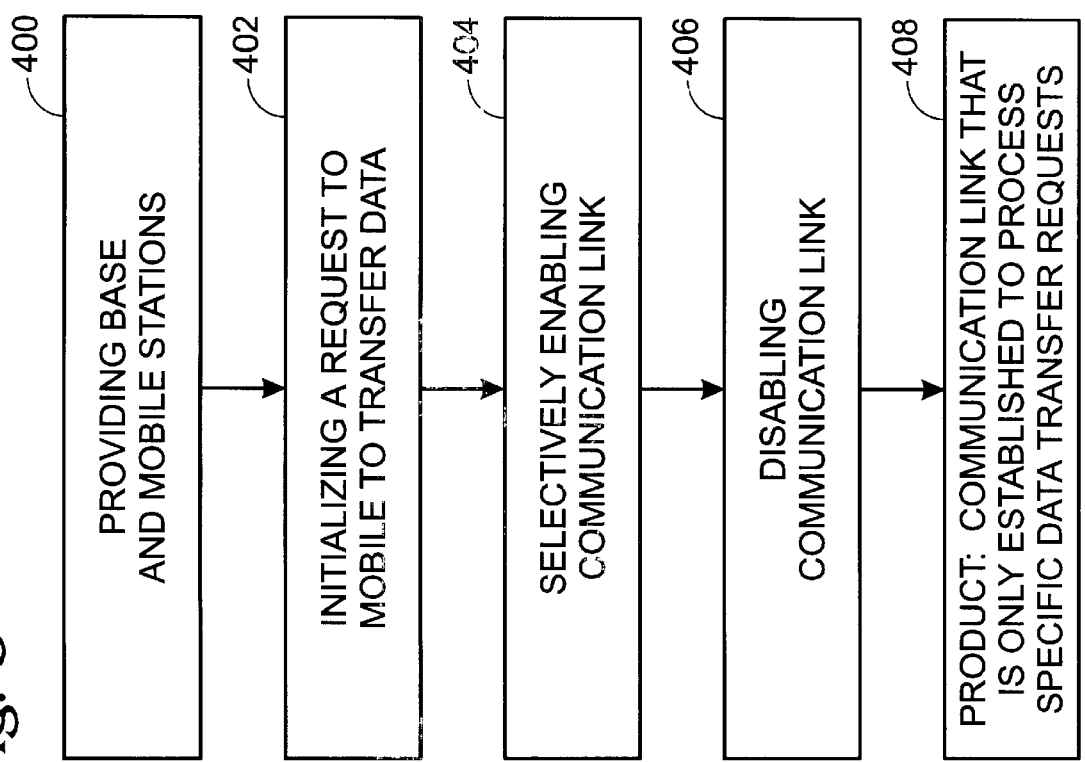
FIG. 2 illustrates the present invention method for a mobile station to organize the transfer of information with a base station.

FIG. 2 illustrates the present invention method for a mobile station to organize the transfer of information with a base station. Step 100 provides a communications system including a base station and at least one mobile station. Step 102 enables the mobile station transceiver when information is to be transferred. The bulk of the data flow is from the mobile to the base station in some aspects. Alternately, the mobile station requests a data download from the base, to the mobile station. Step 104 disables the mobile station transceiver when no information is to be transferred. In some aspects of the invention, the mobile station has a user interface, and a further step follows Step 104. Step 105 maintains the disabled state of the mobile station transceiver until the mobile station receives another request from the user interface to transfer information. In this manner, the user controls when the mobile is communicating with the base station. Step 106 is a product, a deep dormant mode of operation where transceiver power and system processing time are saved by not maintaining the link to the base station between information transfer tasks.

A further step is included, preceding Step 102. Step 100a (not shown) accepts a request from the user interface to transfer information. Step 100a includes establishing a mobile station application program to initiate information transfer requests. Internet browsers, file transfer systems, network management systems, and e-mail software are examples of application programs. A further step follows Step 102, and precedes Step 104. Step 102a (not shown) accepts a request from the user interface to end the transfer of information. In this manner, the organization of information transfer is responsive to the user interface. Typically, the user interface of Step 102a includes establishing a mobile station application program to initiate the end of information transfer request.

In many circumstances a mobile station is on, but not requesting data. For example, the user may be constructing a string of Boolean operators to conduct an internet search, composing a reply to an e-mail, or a screen saver is running. In this situation the mobile station transceiver remains off, unless the mobile is performing other parallel functions for the user, until the user actually request a data transfer. That is, when the user presses the "search" key on the displayed internet browser page, or the user activates the e-mail reply key.

There are numerous other examples that can be imagined where it would be advisable to save mobile power by not monitoring the control channels between information sessions. For example, a remote site mail drop site that sends a message only when a package is deposited at the site. The message may include the package destination, size, weight, and required arrival date to optimize the remote site pick-up schedule. Alternately, such a system could be used to report on wildlife counts and sighting times in remote locations.

Unlike true packet communications systems where a user occupies system resources by a contention based random access scheme, a mobile station packetized connection in a wireless system is often a traffic channel shared with other mobile stations, where a centralized control (such as a base station) assigns the system resources to users (mobile stations). The mobile station acquires the traffic channel to transfer information, and releases the channel when there is no more information, or a time-out occurs.

In some aspects of the invention, Step 102 includes transferring information between the base station and the mobile station by sending and receiving a plurality of data messages. A complete set of data messages, which transfers the information, is called an information session. Then, Step 104 includes disabling the mobile station transceiver at the end of the information session by ceasing the sending and receiving of the data messages. In this manner, the mobile station transceiver is disabled between information sessions.

Typically, Step 102 includes the data message timing and channels between the base station and the mobile station being dependent on a plurality of control messages on a control channel operating between the base and mobile stations. For example, CDMA systems are a communication system which has a wireless link between base and mobile station where Step 102 includes transferring data and control messages through the wireless channel. Actually, CDMA systems have a separate access channel for such control messages when a traffic channel is not being used by a mobile. When the mobile has acquired a traffic channel, control messages are sent on the traffic channel with the data messages. Step 104 includes disabling the control messages between the bases and mobile stations. That is, the mobile station ceases to monitor any control, housekeeping, and access messages transmitted by the base station. Likewise, the mobile station ceases to transmit control, maintenance, and registration messages. Then, Step 105 maintains the disabled state of control messages between the base and mobile stations, until the mobile station receives another request from the user interface to transfer information.

In some aspects of the invention, a further step follows Step 100a, and precedes Step 102. Step 100b (not shown) establishes a circuit switched connection between the mobile station and the base station. As is well known in the art, a circuit switched connection is a mobile station traffic channel assignment made by the base station. Typically, a specific type of circuit switched connection is established, a packet switched connection. A further step follows Step 104, and precedes Step 105. Step 104a (not shown) breaks the circuit switched connection between the mobile station and the base station. Alternately stated, Step 104a breaks the packet switched connection between the mobile and base stations.

The present invention is advantageous because it permits mobile stations to cease control channel monitoring functions in between information sessions. The main advantage appears to be in conservation of battery power. Mobile wireless units are typically small and portable. Battery power is always a primary concern in the operation of such portable units. In some aspects of the invention, the communication system includes a wireless link between the base and mobile stations, and Step 102 transfers data and control messages through a wireless channel.

FIG. 3 illustrates another preferred embodiment of the present invention method for the mobile station to conserve power in the transfer of information with the base station. Step 200 provides a communications system including a base station and at least one mobile station. Step 202 establishes a mobile station physical connection with the base station in response to a first request to transfer information. Step 204, in response to Step 202, establishes a mobile station logical connection with the base station. A logical connection is an agreement made between communicating parties before data is actually transferred, i.e., a PPP connection.

Step 206 breaks the mobile station physical connection with the base station after the information has been transferred, and Step 208 waits for a subsequent request to transfer information. Step 210 is a product, where the breaking of connections between information transfers, by the mobile station, saves mobile station processing time and mobile station power.

In some aspects of the invention, a mobile station transceiver is provided. Then, Step 202 includes the physical connection being a circuit switched connection between the base station and the mobile station transceiver.

In some aspects of the invention, a mobile station, user accessible, applications program is provided. A further step then precedes Step 202. Step 200a (not shown) generates a request to transfer information in response to the applications program. Then, Step 202 includes the physical connection being established in response to a request to transfer information in Step 200a. A further step precedes Step 206. Step 204a (not shown) generates a signal that the information transfer is complete, and Step 206 includes the physical connection being broken in response to the information transfer complete signal of Step 204a.

Typically, the communications system includes a wireless link, with at least one wireless communications channel. The wireless link may be between mobile and base transceivers, or between a mobile unit transceiver and a transceiver equipped remote LAN site or hardwired packet data communication system. For example, a modem equipped computer with a transceiver which communicates with a mobile unit. Step 202 includes the physical connection being a wireless communications channel.

In some aspects of the invention, Step 204 includes transferring information, through the wireless communications channel, through a plurality of transmitted and received data messages, with the sum of the data messages being an information session. Step 206 ends the information transfer by ceasing the transmission and reception of data messages in Step 204.

Likewise, Step 202 establishes a physical connection, through a wireless communications channel, by communicating a plurality of control messages between the mobile station and the base station to coordinate the establishment of the logical connection in Step 204. Step 208 breaks the physical connection by ceasing the communication of control messages between the mobile station and the base station. That is, the mobile station ceases to monitor base station transmitted control messages.

Figure 1:
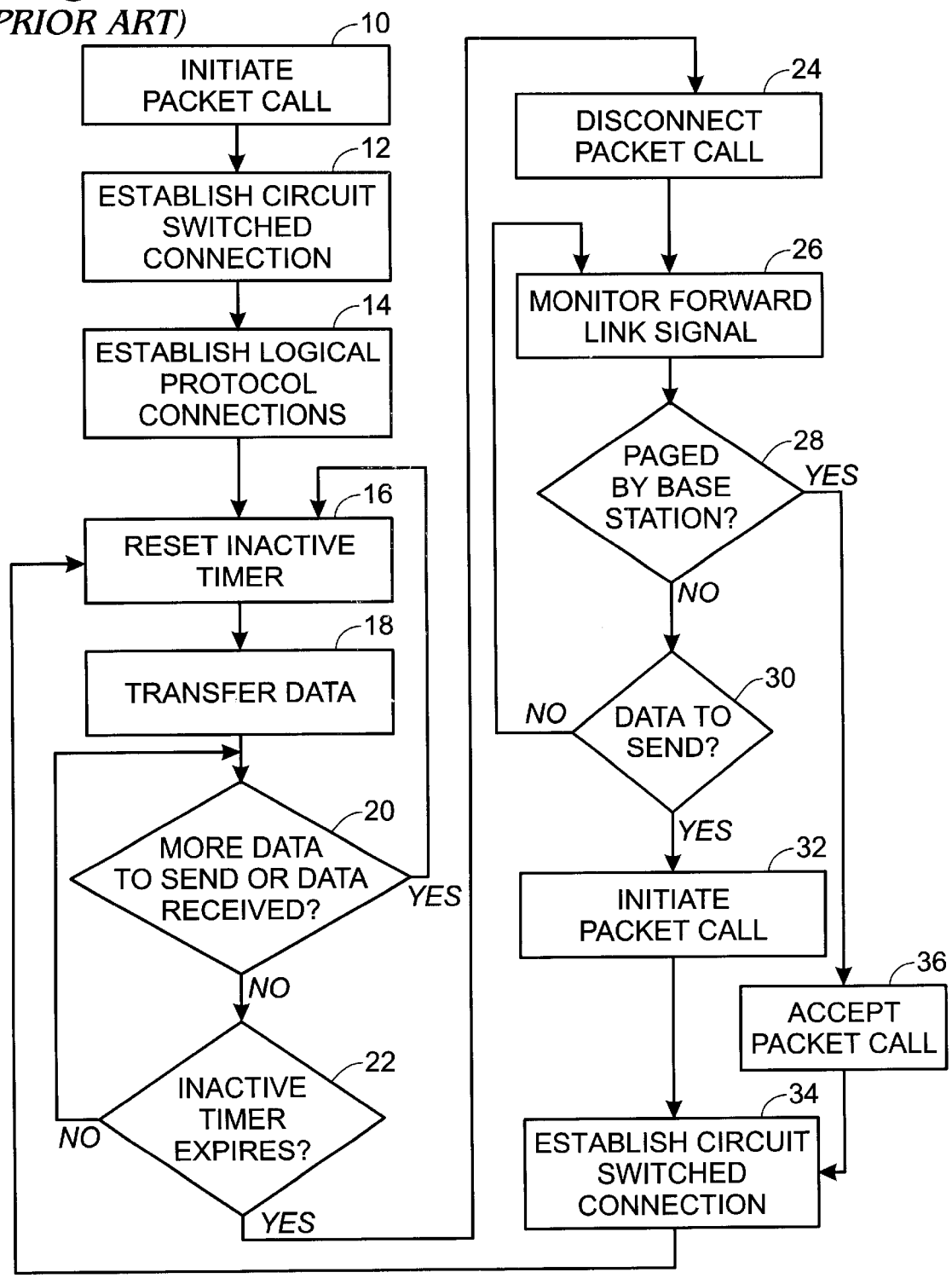
FIG. 1 illustrates a prior art algorithm for packet switched communications.

FIG. 4 illustrates a more detailed algorithm of the present invention packet switched communication method illustrated in FIGS. 2 and 3. In the preliminary steps (Steps 300–314), the mobile station performs the same procedures as the prior art (Steps 10–24, FIG. 1). In Step 316, the mobile station checks if all the requested data has been received. If so, it considers that a session has been completed, and places its circuit into the dormant mode (Step 318). The mobile station completely turns off the receiver circuit, at all the times, and waits only for the arrival of a request for the next session of data from the application program (Step 320). Upon the arrival of the request (Yes, Step 320), the mobile station initiates a packet call in Step 322. In Step 324 the circuit switched connection is re-established, and the inactive timer is reset in Step 306. The data transfer starts again in Step 308.

If the physical connection is broken before the information session is complete, such as when an inactive timer expires in Step 312, the mobile station performs the same procedures described in the prior art. That is, from the "No" output of Step 316, the method proceeds to Steps 326–332, which are the same as Step 26–36 in FIG. 1. If timers associated with the logical connection (not shown) expire, the logical protocol connection has been terminated. The mobile station can optionally be configured to transit from the dormant mode to the standby mode, as understood in the prior art, where the mobile station monitors the forward link signal at recurring time intervals.

Figure 5:
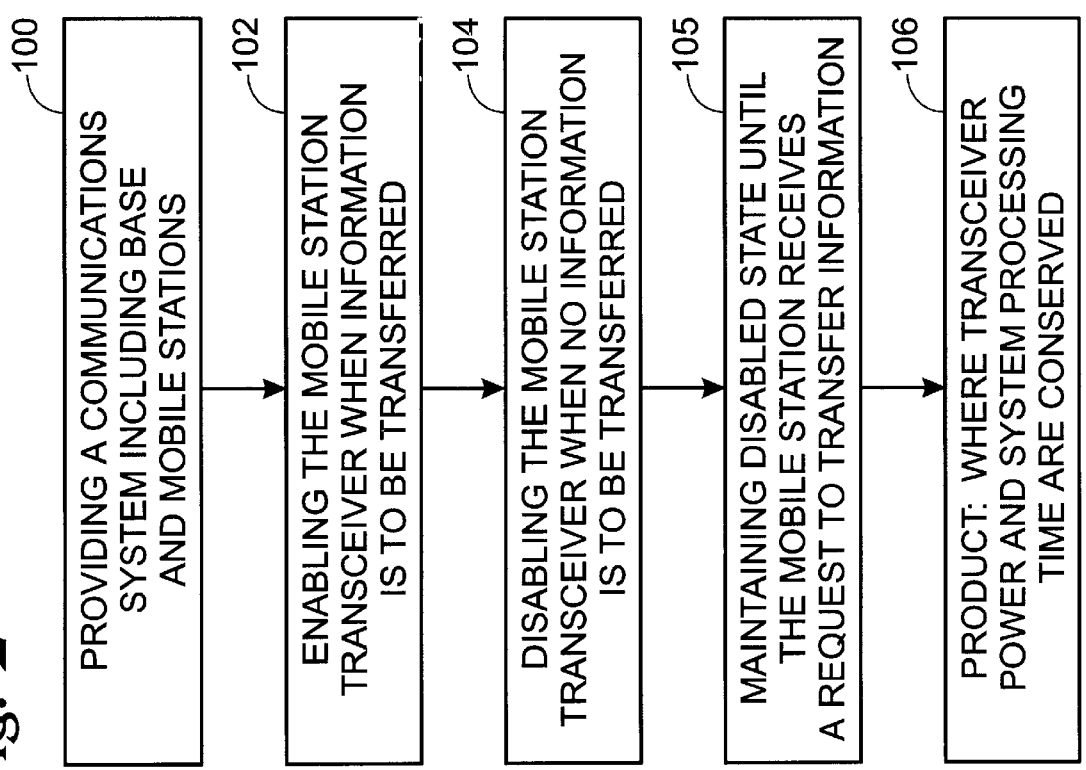
FIG. 5 illustrates a method of intermittently establishing wireless communications.

In another preferred embodiment of the present invention, FIG. 5 illustrates a method of intermittently establishing wireless communications. Step 400 provides a base station and a mobile station. Step 402 initializes a request to the mobile station that data be transferred. Step 404 selectively enables the communication link between the mobile and base stations in response to the data request in Step 402, and Step 406 disables the communication link established in Step 404 after the data transfer is complete. Step 408 is a product, where the communications link is only established to process specific requests to transfer data.

The present invention method permits the conservation of battery power in a mobile station which occasionally transfers data. The method is especially practical in the transfer of large amounts of data that need not be received in real-time. If only the mobile unit user, or mobile unit imbedded applications program initiates requests for data transfer, the mobile station need not monitor the forward link signal. A mobile station in the dormant mode saves battery power by completely disabling the receiver circuit. As a result, the mobile station enjoys longer battery life. Other variations and embodiments of the above-described communications method will occur to those skilled in the art.

What is claimed is:

1. In a communications system including a base station and at least one mobile station, a method for the mobile station to organize the transfer of information with the base station, the method comprising the steps of:
   a) enabling the mobile station transceiver to communicate control messages when information is to be transferred with an application program selected from the group including Internet browsers, file transfer systems, network management systems, and e-mail software; and
   b) disabling the mobile station transceiver by ceasing the monitoring of control messages when no information is to be transferred, whereby transceiver power and system processing time are saved by not maintaining the link to the base station between information transfer tasks.

2. A method as in claim 1 wherein the mobile station has a user interface, including the step, preceding Step a), of:
   accepting a request from the user interface to transfer information; and
   including a further step, following Step a), and preceding Step b), of:
   a1) accepting a request from the user interface to end the transfer of information, whereby the organization of the data transfer is responsive to the user interface.

3. A method as in claim 2 in which the step of accepting a request from the user interface to transfer information includes establishing a mobile station application program to initiate information transfer requests.

4. A method as in claim 3 including a further step, following the step of accepting a request from the user interface to transfer information, and preceding Step a), of:
   establishing a circuit switched connection between the mobile station and the base station; and
   including a further step following Step b) of:
   b1) breaking the circuit switched connection between the mobile station and the base station.

5. A method as in claim 4 in which the step of establishing a circuit switched connection between the mobile station and the base station Step b1) include the circuit switched connection being a packet switched connection.

6. A method as in claim 2 in which the user interface of Step a1) includes establishing a mobile station application program to initiate the end of information transfer request.

7. A method as in claim 1 including the further step, following Step b), of:
   c) maintaining the disabled state of the mobile station transceiver until the mobile station receives another request from the user interface to transfer information, whereby the user controls when the mobile is communicating with the base station.

8. A method as in claim 7 in which Step a) includes the transferring information between the base station and the mobile station by sending and receiving a plurality of data messages, with the complete set of data messages which transfer the information being an information session, and in which Step b) includes disabling the mobile station transceiver at the end of the information session by ceasing the sending and receiving of data messages, whereby the mobile station transceiver is disabled between information sessions.

9. A method as in claim 8 in which Step a) includes the data message timing and channels between the base station and the mobile station being dependent on a plurality of control messages between the base and mobile stations, in which Step b) includes disabling the control messages between the bases and mobile stations, and in which Step c) includes maintaining the disabled state of control messages between the base and mobile stations, until the mobile station receives another request from the user interface to transfer information.

10. A method as in claim 9 wherein the communication system includes a wireless link between the base and mobile stations, and in which Step a) includes transferring data and control messages through a wireless channel.

11. In a communications system including a base station and at least one mobile station, a method for the mobile station to conserve power in the transfer of information with the base station, the method comprising the steps of:
   a) establishing a physical connection with the base station using control messages in response to a first request to transfer information by an application program selected from the group including Internet browsers, file transfer systems, network management systems, and e-mail software;
   b) in response to Step a), establishing a logical connection with the base station;
   c) breaking the physical connection with the base station by ceasing control message monitoring after the information has been transferred; and
   d) waiting for a subsequent request to transfer information, whereby the breaking of connections between information transfers saves mobile station processing and power.

12. A method as in claim 11 wherein a mobile station transceiver is provided, in which Step a) includes the physical connection being a circuit switched connection between the base station and the mobile station transceiver.

13. A method as in claim 12 wherein the communications system includes a wireless link with at least one wireless communications channel, and in which Step a) includes the physical connection being a wireless communications channel.

14. A method as in claim 13 in which Step b) includes transferring information through a plurality of transmitted and received data messages, with the sum of the data messages being an information session, and in which Step c) includes ending the information transfer by ceasing the transmission and reception of data messages.

15. A method as in claim 14 in which Step a) includes establishing a physical connection, through a wireless communications channel, by communicating a plurality of control messages between the mobile station and the base station to coordinate the establishment of the logical connection in Step b), and in which Step d) includes breaking the physical connection by ceasing the communication of control messages between the mobile station and the base station.

16. A method as in claim 11 wherein a mobile station, user accessible applications program is provided, and including a further step, preceding Step a), of:

generating a request to transfer information in response to the applications program;

in which Step a) includes the physical connection being established in response to a request to transfer information, with the request to transfer information being responsive to the applications program;

including a further step, preceding Step c), of:

b1) generating a signal that the information transfer is complete; and in which Step c) includes the physical connection being broken in response to the information transfer complete signal of Step b1).

17. A method of intermittently establishing wireless communications between a base station and a mobile station comprising the steps of:

a) initializing a request from an application program selected from the group including Internet browsers, file transfer systems, network management systems, and e-mail software to the mobile station that data be transferred;

b) using control messages, enabling the communication link between the mobile and base stations in response to the data request in Step a); and c) disabling the communication link established in Step b) by ceasing to monitor control messages after the data transfer is complete, whereby the communications link is only established to process specific requests to transfer data.

* * * * *